United States Patent
Ruot et al.

(10) Patent No.: US 10,597,535 B2
(45) Date of Patent: Mar. 24, 2020

(54) BITUMEN/POLYMER COMPOSITION HAVING IMPROVED MECHANICAL PROPERTIES

(71) Applicant: TOTAL MARKETING SERVICES, Puteaux (FR)

(72) Inventors: Carole Ruot, Irigny (FR); Romuald Botel, Chonas L'Amballan (FR)

(73) Assignee: TOTAL MARKETING SERVICES, Puteaux (FR)

( * ) Notice: Subject to any disclaimer, the term of this patent is extended or adjusted under 35 U.S.C. 154(b) by 0 days.

(21) Appl. No.: 15/757,956

(22) PCT Filed: Sep. 15, 2016

(86) PCT No.: PCT/FR2016/052323
§ 371 (c)(1),
(2) Date: Mar. 6, 2018

(87) PCT Pub. No.: WO2017/046523
PCT Pub. Date: Mar. 23, 2017

(65) Prior Publication Data
US 2018/0244920 A1    Aug. 30, 2018

(30) Foreign Application Priority Data

Sep. 18, 2015 (FR) .................................. 15 58800

(51) Int. Cl.
*C08L 95/00* (2006.01)
*C08L 53/02* (2006.01)

(52) U.S. Cl.
CPC ............ *C08L 95/00* (2013.01); *C08L 53/02* (2013.01); *C08L 2555/22* (2013.01); *C08L 2555/80* (2013.01); *C08L 2555/84* (2013.01)

(58) Field of Classification Search
CPC .. C08L 95/00; C08L 9/06; C08L 37/00; C08L 33/14; C08L 2555/84
See application file for complete search history.

(56) References Cited

U.S. PATENT DOCUMENTS

| | | | |
|---|---|---|---|
| 3,231,635 A | 1/1966 | Holden et al. | |
| 3,251,905 A | 5/1966 | Zelinski | |
| 3,390,207 A | 6/1968 | Moss | |
| 3,598,887 A | 8/1971 | Darcy et al. | |
| 4,219,627 A | 8/1980 | Halasa et al. | |
| 6,011,094 A * | 1/2000 | Planche ................. | C08L 95/00 524/68 |
| 6,020,404 A | 2/2000 | Planche et al. | |
| 2008/0275183 A1* | 11/2008 | Kluttz .................. | C08F 297/04 525/54.5 |
| 2012/0123028 A1 | 5/2012 | Dreesen et al. | |
| 2016/0280919 A1 | 9/2016 | Mouazen et al. | |

FOREIGN PATENT DOCUMENTS

| | | |
|---|---|---|
| EP | 0 387 671 A1 | 9/1990 |
| EP | 0 413 294 A2 | 2/1991 |
| EP | 0 636 654 A1 | 2/1995 |
| WO | 94/22931 A1 | 10/1994 |
| WO | 97/43341 A1 | 11/1997 |
| WO | 2007/058994 A2 | 5/2007 |
| WO | 2008/137394 A1 | 11/2008 |
| WO | 2011/013073 A1 | 2/2011 |
| WO | 2015/071370 A1 | 5/2015 |

OTHER PUBLICATIONS

ASTM D 113-99—Standard Test Method for Ductility of Bituminous Materials (Year: 1999).*
Jan. 23, 2017 International Search Report issued in International Patent Application No. PCT/FR2016/052323.
Jan. 23, 2017 Written Opinion of the International Searching Authority issued in International Patent Application No. PCT/FR2016/052323.

* cited by examiner

*Primary Examiner* — Robert C Boyle
(74) *Attorney, Agent, or Firm* — Oliff PLC

(57) ABSTRACT

Thermally crosslinkable bitumen/polymer composition based on at least one elastomer of S-B1-B2 type, with S a styrene polymer or other vinylaromatic polymer, B1 and B2 polybutadienes, the composition including an adjuvant of olefinic polymer type, the composition having improved mechanical properties. Use of these compositions in the fields of road applications such as hot bituminous mixes; warm bituminous mixes; cold bituminous mixes, for example cold-poured bituminous mixes or emulsion gravels; or surface dressings, for example fluxed bitumens or emulsions; and in the fields of industrial applications, for example in the manufacture of internal and external coatings.

13 Claims, No Drawings

BITUMEN/POLYMER COMPOSITION HAVING IMPROVED MECHANICAL PROPERTIES

TECHNICAL FIELD

The present invention relates to the field of bitumens. More specifically, it relates to thermally crosslinkable bitumen/polymer compositions comprising an adjuvant of olefinic polymer type, these compositions having improved mechanical properties.

The invention also relates to the use of these compositions in the fields of road applications such as hot bituminous mixes; warm bituminous mixes; cold bituminous mixes, for example cold-poured bituminous mixes or emulsion gravels; or surface dressings, for example fluxed bitumens or emulsions; and in the fields of industrial applications, for example in the manufacture of internal and external coatings.

PRIOR ART

Numerous studies have focused on improving the mechanical, elastic and/or rheological properties of bituminous compositions. Bitumen/polymer compositions having improved properties and also their preparation process have been widely described in the literature.

Among the polymers added to bitumens, random or block copolymers of styrene and a conjugated diene and, in particular, of styrene and butadiene or of styrene and isoprene are known for being particularly effective as they mix very easily in bitumens and give them excellent mechanical properties and in particular very good elastic properties.

These bitumen/polymer compositions are used for the preparation of binders for various surface coatings and, in particular, as road surfacings, on condition that these compositions have, in combination, a certain number of mechanical characteristics. Optimized mechanical characteristics such as the elastic properties are in particular crucial for applications in road surfacings.

Application WO 97/43341 describes bitumen/polymer compositions containing a bitumen or a mixture of bitumens and 0.3% to 20%, by weight relative to the weight of bitumen, of at least one primary polymer selected from certain elastomers and plastomers and 0.01% to 12% by weight of at least one adjuvant of olefinic polymer type bearing epoxy or COOH groups. The polymers used in this document are different from those of the invention. The role of the adjuvant is to prevent demixing between the bituminous phase and the polymer phase, which improves the storage stability of the composition.

Application WO 2015/071370 describes bitumen/polymer compositions having improved low-temperature mechanical properties and comprising:
 a first bitumen base having an intrinsic stability S of greater than 2.5 and/or a degree of peptization Sa of greater than 0.60,
 a second bitumen base having an intrinsic stability S of less than or equal to 2.50 and/or a degree of peptization Sa of less than or equal to 0.60,
 an elastomer, and
 an olefinic polymer adjuvant functionalized by at least glycidyl functional groups.

The compositions illustrated are crosslinked with sulphur and use an SBS block terpolymer.

Application WO 2008/137394 describes a process for preparing a polymer modified bituminous binder composition in the absence of crosslinking agents by heating a bitumen at a temperature of from 160° C. to 221° C., adding a block copolymer composition and stirring to form a homogeneous mixture. The block copolymer compositions utilized comprise one or more block copolymers having at least one monovinylaromatic block, at least one polybutadiene block having a vinyl content of less than 15 mole percent and at least one polybutadiene block having a vinyl content of greater than 25 mole percent. It is taught that the bitumen/polymer compositions thus formulated have improved mechanical properties, such as the ductility, and a good storage stability.

However, it was observed that the mechanical properties of some of these compositions were not entirely satisfactory, in particular it was observed that the tensile strength of these compositions was generally inadequate.

It was also observed that the storage stability of some of these compositions was not entirely satisfactory.

The aim of the invention was to develop an additive-supplemented bitumen composition which is thermally crosslinkable and which has improved elastic properties and improved storage stability. A system was sought that is effective in all sorts of bitumens and which is not limited to an application to very specific bitumens. It was sought to develop compositions having an improved tensile strength and a satisfactory storage stability.

SUMMARY OF THE INVENTION

The invention relates to a bitumen/polymer composition comprising:
 bitumen,
 at least one elastomer, and
 at least one olefinic polymer adjuvant functionalized by at least glycidyl functional groups,
  characterized in that:
 the elastomer is selected from thermally crosslinkable block copolymers of formula S-B1-B2, in which S represents a monovinylaromatic hydrocarbon block having a peak molecular weight of from 10 000 to 25 000, B1 is a polybutadiene block having a vinyl content of less than or equal to 15 mole percent, B2 is a polybutadiene block having a vinyl content of greater than or equal to 25 mole percent, the B1/B2 weight ratio is greater than or equal to 1:1, and in which the S-B1-B2 block copolymer has a peak molecular weight of from 40 000 to 200 000;
 the elastomer may also comprise at least one thermally crosslinkable block copolymer corresponding to the formula $(S-B1-B2)_nX$ in which each S represents a monovinylaromatic hydrocarbon block having a peak molecular weight of from 10 000 to 25 000, each B1 represents a polybutadiene block having a vinyl content of less than or equal to 15 mole percent, each B2 represents a polybutadiene block having a vinyl content of greater than or equal to 25 mole percent, n is an integer ranging from 2 to 6, and X is the residue of a coupling agent, in which the B1/B2 weight ratio is greater than or equal to 1:1, and the $(S-B1-B2)_nX$ block copolymer has a peak molecular weight which is from 1.5 to 6.0 times the peak molecular weight of the S-B1-B2 block copolymer;
 and the elastomer/adjuvant weight ratio in the composition ranges from 15/1 to 2/1

Another subject of the invention is a process for preparing a bitumen/polymer composition as defined above, and below for the preferred embodiments, characterized in that the following are brought into contact, the operation being carried out at temperatures between 100° C. and 200° C. and with stirring for a period of at least 10 minutes:
bitumen,
from 0.5% to 20% by weight of at least one elastomer,
from 0.05% to 2.5% by weight of at least one olefinic polymer adjuvant,
optionally additives.

According to one preferred embodiment, the $$S\text{-}B1\text{-}B2/(S\text{-}B1\text{-}B2)_nX$$

weight ratio is greater than or equal to 1:1, preferably from 1:1 to 10:1, and better still from 1:1 to 4:1.

According to one preferred embodiment, S represents styrene.

According to one preferred embodiment, the composition comprises from 0.5% to 20% by weight of elastomer relative to the total weight of the composition, preferably from 0.5% to 15%.

According to one preferred embodiment, the composition comprises from 0.05% to 2.5% by weight of olefinic polymer adjuvant relative to the total weight of the composition, preferably from 0.15% to 2%.

According to one preferred embodiment, the olefinic polymer adjuvant is selected from the group consisting of:
(a) random or block copolymers of ethylene and of a monomer selected from glycidyl acrylate and glycidyl methacrylate, comprising from 50% to 99.7% by weight of ethylene;
(b) random or block terpolymers of ethylene, of a monomer A selected from vinyl acetate and $C_1$ to $C_6$ alkyl acrylates or methacrylates and of a monomer B selected from glycidyl acrylate and glycidyl methacrylate, comprising from 0.5% to 40% by weight of units resulting from the monomer A and from 0.5% to 15% by weight of units resulting from the monomer B, the remainder being formed of units resulting from the ethylene; and
(c) copolymers resulting from the grafting of a monomer B, selected from glycidyl acrylate and glycidyl methacrylate, to a substrate consisting of a polymer selected from polyethylenes, polypropylenes, random or block copolymers of ethylene and of vinyl acetate and random or block copolymers of ethylene and of $C_1$ to $C_6$ alkyl acrylate or methacrylate, comprising from 40% to 99.7% by weight of ethylene, said grafted copolymers comprising from 0.5% to 15% by weight of grafted units resulting from the monomer B,
(d) mixtures of at least two compounds (a), (b) and (c).

According to one advantageous embodiment, the olefinic polymer adjuvant is selected from random or block terpolymers of ethylene, of a monomer A selected from vinyl acetate and $C_1$ to $C_6$ alkyl acrylates or methacrylates and of a monomer B selected from glycidyl acrylate and glycidyl methacrylate, comprising from 0.5% to 40% by weight of units resulting from the monomer A and from 0.5% to 15% by weight of units resulting from the monomer B, the remainder being formed of units resulting from the ethylene.

According to one even more advantageous embodiment, the olefinic polymer adjuvant is selected from random terpolymers of ethylene, of a monomer A selected from $C_1$ to $C_6$ alkyl acrylates or methacrylates and of a monomer B selected from glycidyl acrylate and glycidyl methacrylate, comprising from 0.5% to 40% by weight of units resulting from the monomer A and from 0.5% to 15% by weight of units resulting from the monomer B, the remainder being formed of units resulting from the ethylene.

The invention also relates to an asphalt, characterized in that it comprises at least one bitumen/polymer composition as defined above, and mineral and/or synthetic fillers.

The invention also relates to an asphalt, characterized in that it essentially consists of at least one bitumen/polymer composition as defined above, and mineral and/or synthetic fillers.

The invention also relates to a bituminous mix, characterized in that it comprises at least one bitumen/polymer composition as defined above, aggregates, and optionally mineral and/or synthetic fillers.

The invention also relates to a bituminous mix, characterized in that it essentially consists of at least one bitumen/polymer composition as defined above, aggregates, and optionally mineral and/or synthetic fillers.

The invention also relates to the use of at least one bitumen/polymer composition as defined above, for preparing a surface dressing, a hot bituminous mix, a warm bituminous mix, a cold bituminous mix, a cold-poured bituminous mix, an emulsion gravel, said binder being combined with aggregates and/or recycled milled products.

The invention also relates to the use of at least one bitumen/polymer composition as defined above, for preparing a waterproof coating, a membrane or a seal coat.

The compositions of the invention have numerous advantages: they have improved elastic properties, in particular an improved tensile strength, especially a tension at 5° C. measured according to the EN 13587 standard of greater than or equal to 500%. They also have a satisfactory high-temperature storage stability, in particular a storage stability at 180° C. of greater than or equal to 3 days, especially a storage stability at 180° C. characterized by a penetrability variation at 25° C. measured according to the EN 1426 standard of less than or equal to 5¹⁄₁₀ mm and/or a ring and ball temperature variation measured according to the EN 1427 standard of less than or equal to 5° C. The combination of elastomer and olefinic polymer adjuvant developed makes it possible to improve the mechanical properties, especially the elastic properties, and the storage stability of a wide range of bitumen compositions.

DETAILED DESCRIPTION

The applicant has discovered that the use of a specific elastomer in combination with a particular polymer adjuvant for the preparation of the bitumen/polymer compositions makes it possible to surprisingly improve the mechanical properties, especially the elastic properties, in particular the tensile strength properties, and the storage stability of this bitumen/polymer composition. Specifically, the applicant has demonstrated a particular synergistic effect induced by the joint use of a particular elastomer and a specific polymer adjuvant. This observation is not limited to a particular bitumen type.

In addition, the bitumen/polymer composition of the invention has the advantage of being economical relative to a bitumen/polymer composition based on the same S-B1-B2 block polymers but without adjuvant. Specifically, the addition of the adjuvant, in a small amount, makes it possible to significantly reduce the amount of block polymer used, with equivalent or even higher mechanical properties and makes it possible to obtain a very satisfactory storage stability.

In the present invention, the expressions "bitumen/polymer composition" and "bitumen/polymer binder" represent the same type of composition and are used interchangeably.

The expression "essentially consists of" followed by one or more characteristics, means that, in addition to the components or steps explicitly cited, components or steps that do not significantly modify the properties and characteristics of the invention may be included in the process or the material of the invention.

The Bitumens:

The invention relates to bitumens. These may be formed by one or more bitumen bases.

A "bitumen" is understood to mean any bituminous composition consisting of one or more bitumen bases and optionally comprising one or more chemical additives, said compositions being intended for a road application or an industrial application.

Among the bitumen bases that can be used according to the invention, mention may firstly be made of bitumens of natural origin, those contained in natural bitumen or natural asphalt deposits or bitumen sands and bitumens originating from the refining of crude oil. The bitumen bases according to the invention are advantageously selected from the bitumen bases originating from the refining of crude oil. The bitumen bases may be selected from the bitumen bases or mixtures of bitumen bases originating from the refining of crude oil, in particular bitumen bases containing asphaltenes or pitch. The bitumen bases may be obtained by conventional processes for manufacturing bitumen bases in a refinery, in particular by direct distillation and/or vacuum distillation of oil. These bitumen bases may optionally be visbroken and/or deasphalted and/or air-rectified. It is common to vacuum distill the atmospheric residues originating from the atmospheric distillation of crude oil. This manufacturing process consequently corresponds to the sequence of an atmospheric distillation and of a vacuum distillation, the feedstock feeding the vacuum distillation corresponding to the atmospheric residues. These vacuum residues resulting from the vacuum distillation tower can also be used as bitumens. It is also common to inject air into a feedstock customarily composed of distillates and heavy products originating from the vacuum distillation of atmospheric residues originating from the distillation of oil. This process makes it possible to obtain a blown, or semi-blown or oxidized or air-rectified or partially air-rectified base.

The various bitumen bases obtained by the refining processes may be combined together in order to obtain the best technical compromise. The bitumen base may also be a recycled bitumen base. The bitumen bases may be bitumen bases of hard grade or of soft grade.

According to the invention, the conventional processes for manufacturing bitumen bases are carried out at manufacturing temperatures of between 100° C. and 200° C., preferably between 140° C. and 200° C., and with stirring for a period of at least 10 minutes, preferably of between 30 minutes and 10 hours, more preferably between 1 hour and 6 hours. The term "manufacturing temperature" is understood to mean the temperature to which the bitumen base(s) is (are) heated before mixing and also the mixing temperature. The heating temperature and time vary depending on the amount of bitumen used and are defined by the NF EN 12594 standard.

According to the invention, blown bitumens may be manufactured in a blowing unit, by passing a stream of air and/or of oxygen through an initial bituminous base. This operation may be carried out in the presence of an oxidation catalyst, for example phosphoric acid. Generally, the blowing is carried out at high temperatures, of the order of 200° C. to 300° C., for relatively long periods, typically of between 30 minutes and 2 hours, continuously or batchwise. The blowing time and temperature are adjusted as a function of the properties targeted for the blown bitumen and as a function of the quality of the initial bitumen.

The bitumen may also be a recycled bitumen.

The bitumens may be bitumens of hard grade or of soft grade. The bitumens that can be used according to the invention have a penetrability, measured at 25° C. according to the EN 1426 standard, of from 5 to 330 ¹/₁₀ mm, preferably from 10 to 220 ¹/₁₀ mm, more preferably from 10 to 120 ¹/₁₀ mm.

In a well known manner, the "needle penetrability" measurement is carried out by means of an NF EN 1426 standardized test at 25° C. ($P_{25}$). This penetrability characteristic is expressed in tenths of a millimetre (dmm or ¹/₁₀ mm). The needle penetrability, measured at 25° C., according to the NF EN 1426 standardized test, represents the measurement of the penetration of a needle, the weight of which with its support is 100 g, into a bitumen sample, after a time of 5 seconds. The NF EN 1426 standard replaces the approved NF T 66-004 standard of December 1986 with effect from 20 Dec. 1999 (decision of the Directorate General of AFNOR of 20 Nov. 1999).

The Olefinic Polymer Adjuvant

The olefinic polymer adjuvant is selected, preferably, from the group consisting of (a) ethylene/glycidyl (meth) acrylate copolymers; (b) ethylene/monomer A/monomer B terpolymers; (c) copolymers resulting from the grafting of a monomer B to a polymer substrate and (d) mixtures of these copolymers.

(a) The ethylene/glycidyl (meth)acrylate copolymers are, advantageously, selected from random or block, preferably random, copolymers of ethylene and of a monomer selected from glycidyl acrylate and glycidyl methacrylate, comprising from 50% to 99.7% by weight, preferably from 60% to 95% by weight and more preferably from 60% to 90% by weight of ethylene.

(b) The terpolymers are, advantageously, selected from random or block, preferably random, terpolymers of ethylene, of a monomer A and of a monomer B.

The monomer A is selected from vinyl acetate and $C_1$ to $C_6$ alkyl acrylates or methacrylates.

The monomer B is selected from glycidyl acrylate and glycidyl methacrylate.

The ethylene/monomer A/monomer B terpolymers comprise from 0.5% to 40% by weight, preferably from 5% to 35% by weight and more preferably from 10% 10 to 30% by weight of units resulting from the monomer A and from 0.5% to 15% by weight, preferably from 2.5% to 15% by weight of units resulting from the monomer B, the remainder being formed of units resulting from the ethylene.

(c) The copolymers result from the grafting of a monomer B, selected from glycidyl acrylate and glycidyl methacrylate, to a polymer substrate. The polymer substrate consists of a polymer selected from polyethylenes, in particular low-density polyethylenes, polypropylenes, random or block, preferably random, copolymers of ethylene and of vinyl acetate and random or block, preferably random, copolymers of ethylene and of $C_1$ to $C_6$ alkyl acrylate or methacrylate, comprising from 40% to 99.7% by weight, preferably from 50% to 99% by weight of ethylene. Said grafted copolymers comprise from 0.5% to 15% by weight, preferably from 2.5% to 15% by weight, of grafted units resulting from the monomer B.

(d) The olefinic polymer adjuvant may consist of a mixture of two or more copolymers selected from the categories (a), (b) and (c).

The olefinic polymer adjuvant is, preferably, selected from the ethylene/monomer A/monomer B terpolymers (b) described above and from the mixtures (d) comprising them.

The olefinic polymer adjuvant is, advantageously, selected from the ethylene/monomer A/monomer B terpolymers (b) described above and from the mixtures (d) in which the terpolymers (b) represent at least 50% by weight relative to the total weight of the mixture, preferably at least 75% by weight, better still at least 90% by weight.

Advantageously, the olefinic polymer adjuvant is selected from random terpolymers of ethylene, of a monomer A selected from $C_1$ to $C_6$ alkyl acrylates or methacrylates and of a monomer B selected from glycidyl acrylate and glycidyl methacrylate, comprising from 0.5% to 40% by weight, preferably from 5% to 35% by weight and more preferably from 10% to 30% by weight of units resulting from the monomer A and from 0.5% to 15% by weight, preferably from 2.5% to 15% by weight of units resulting from the monomer B, the remainder being formed of units resulting from the ethylene.

The Elastomer:

The elastomer is a triblock copolymer or a mixture of triblock copolymers.

It is selected from the thermally crosslinkable block copolymers of formula S-B1-B2, in which S represents a monovinylaromatic hydrocarbon block having a peak molecular weight of from 10 000 to 25 000, B1 is a polybutadiene block having a vinyl content of less than or equal to 15 mole percent, B2 is a polybutadiene block having a vinyl content of greater than or equal to 25 mole percent, and the B1/B2 weight ratio is greater than or equal to 1:1, and in which the S-B1-B2 block terpolymer has a peak molecular weight of from about 40 000 to about 200 000.

The elastomer may also comprise at least one thermally crosslinkable block copolymer corresponding to the formula (S-B1-B2)$_n$X in which each S represents a monovinylaromatic hydrocarbon block having a peak molecular weight of from 10 000 to 25 000, each B1 represents a polybutadiene block having a vinyl content of less than or equal to 15 mole percent, each B2 represents a polybutadiene block having a vinyl content of greater than or equal to 25 mole percent, n is an integer ranging from 2 to 6, and X is the residue of a coupling agent, the B1/B2 weight ratio is greater than or equal to 1:1, and the (S-B1-B2)$_n$X block copolymer has a peak molecular weight which is from 1.5 to 6.0 times the peak molecular weight of the S-B1-B2 block copolymer.

The monovinylaromatic hydrocarbon groups denoted by S may be any monovinylaromatic hydrocarbon compound known for use in the preparation of block copolymers, such as: styrene, o-methylstyrene, p-methylstyrene, p-tert-butylstyrene, 2,4-dimethylstyrene, alpha-methylstyrene, vinylnaphthalene, vinyltoluene and vinylxylene or mixtures thereof. The preferred monovinylaromatic hydrocarbon compound according to the present invention is styrene, which is used as substantially pure monomer or as major component in mixtures with minor proportions of another vinylaromatic monomer of similar structure, such as o-methylstyrene, p-methylstyrene, p-tert-butylstyrene, 2,4-dimethylstyrene, alpha-methylstyrene, vinylnaphthalene, vinyltoluene and vinylxylene, namely in proportions of at most 10% by weight. The use of substantially pure styrene is particularly preferred in the present invention.

The polybutadiene blocks B1, B2 incorporated in the composition of the block copolymers mentioned above are based on butadiene monomer that is practically pure or that comprises minor proportions, up to 10% by weight, of structurally similar conjugated dienes. Preferably, the polybutadiene is constituted purely from butadiene monomer.

As regards the block copolymers of the present invention, the term "molecular weight" refers to the true molecular weight in g/mole of the block copolymer. The molecular weights mentioned in the description and the claims may be measured by gel permeation chromatography (GPC) using polystyrene standards, for example as taught according to the ASTM 3536 standard. GPC is a well-known process in which the polymers are separated according to their molecular weight, the largest molecule being eluted first. The chromatograph is calibrated using commercially available polystyrene standards of various molecular weights. The molecular weight of the polymers measured by GPC is a styrene equivalent molecular weight. The styrene equivalent molecular weight may be converted to a true molecular weight when the styrene content of the polymer and the vinyl content of the diene blocks are known. The detector used is preferably a combination of ultraviolet rays and of a refractive index detector. The molecular weights are measured at the top of the GPC peak, converted to true molecular weights, and are commonly referred to as "peak molecular weights".

The peak molecular weight of each monovinylaromatic hydrocarbon block, in particular polystyrene block, is from about 10 000 to about 25 000, preferably from about 12 000 to about 20 000. According to one preferred variant, the peak molecular weight of the styrene blocks ranges from about 14 000 to about 18 000.

Each block copolymer of formula S-B1-B2 used in the present invention has a peak molecular weight of from about 40 000 to about 200 000, preferably from about 65 000 to about 160 000, more preferably from about 75 000 to about 150 000, and even more preferably from about 75 000 to 130 000.

The peak molecular weight of the block copolymers of formula (S-B1-B2)$_n$X depends on the peak molecular weight of the block copolymer of formula S-B1-B2 used. More specifically, the peak molecular weight of the (S-B1-B2)$_n$X copolymers is from about 1.5 to about 6.0 times the peak molecular weight of the S-B1-B2 block copolymer. Preferably, the peak molecular weight of the (S-B1-B2)$_n$X block copolymers is from about 1.8 to about 5.0 times the peak molecular weight of the S-B1-B2 block copolymer.

The combined molecular weight of the two butadiene blocks (B1 and B2) is from about 25 000 to about 190 000. The two butadiene blocks (B1 and B2) are present in a B1/B2 weight ratio greater than or equal to 1:1. In other words, B1 is present in an amount (% by weight) greater than or equal to 50% of the total of the B1-B2 segment and B2 is present in an amount (% by weight) less than or equal to 50% of the total of the B1-B2 segment.

When the 1,3-butadiene is polymerized by means of a 1,2-addition mechanism, the result is a pendant vinyl group relative to the backbone of the polymer. As indicated above, the polybutadiene is present in blocks or segments that contain various vinyl contents. This vinyl content makes it possible to characterize the polymer.

As regards the B1 polybutadiene block, it is preferable that there be at most about 15 mole percent of vinyl in the B1 block. Preferably, the vinyl content in the B1 block should be from about 5 mole percent to about 15 mole percent of the condensed polybutadiene units. Taking into consideration known anionic polymerization of butadiene processes, typically from about 7 to about 15 mole percent of the polybutadiene units have the 1,2-addition configuration.

As regards the B2 polybutadiene block, it is preferable that there be at least 25 mole percent of vinyl in the B2 block. Preferably, the vinyl content in the B2 block is from about 25 mole percent to about 80 mole percent of the condensed polybutadiene units, better still about 40 mole percent to about 75 mole percent of the polybutadiene units have a 1,2-addition configuration, and even more preferably from about 50 to about 65 mole percent of the polybutadiene units have a 1,2-addition configuration.

The monovinylaromatic hydrocarbon monomer content of the copolymer (preferably the styrene content) is from about 10% to about 40% by weight, relative to the total weight of the S-B1-B2 and optionally (S-B1-B2)$_n$X block copolymer. Preferably, the monovinylaromatic hydrocarbon (advantageously styrene) content of the S-B1-B2, and optionally (S-B1-B2)$_n$X, block copolymers is from about 18% to about 35% by weight, more preferably from about 19% to about 32% by weight, relative to the total weight of the copolymer.

In one preferred embodiment of the invention, the elastomer comprises a block copolymer corresponding to the formula S-B1-B2 alone.

In another preferred embodiment, S-B1-B2 is used in combination with a block copolymer of formula (S-B1-B2)$_n$X in which each S is a monovinylaromatic hydrocarbon block, preferably styrene, each B1 is a polybutadiene block having a vinyl content of less than or equal to 15 mole percent, each B2 is a polybutadiene block having a vinyl content greater than or equal to 25 mole percent, n is an integer ranging from 2 to 6 and X is the residue of a coupling agent. When the block copolymers of formula (S-B1-B2)$_n$X are used, preferably, n is an integer ranging from 2 to 4, more advantageously n=2.

Advantageously, the block copolymers of the invention are in an essentially unhydrogenated form. When the block copolymer composition comprises such a mixture, the S-B1-B2/(S-B1-B2)$_n$X block copolymer weight ratio is greater than or equal to about 1:1. In a particularly preferred embodiment, the ratio is from about 1:1 to about 10:1, the preferred ratio being from about 1:1 to about 4:1.

The weight-average molecular weight of the elastomer is, advantageously, between 10 000 and 600 000 daltons, preferably between 30 000 and 400 000 daltons.

The block copolymers used in the invention are described in WO 2008/137394. A process for their preparation is described in documents U.S. Pat. Nos. 3,231,635; 3,251,905; 3,390,207; 3,598,887; 4,219,627; EP 0 413 294; EP 0 387 671; EP 0 636 654 and WO 94/22931.

The composition may comprise elastomers other than the S-B1-B2 block terpolymers and the (S-BI-B2)$_n$X copolymers.

In particular, the composition according to the invention may contain other known bitumen elastomers such as the copolymers SB (styrene-butadiene block copolymer), SBS (styrene-butadiene-styrene block copolymer), SIS (styrene-isoprene-styrene), SBS* (styrene-butadiene-styrene star block copolymer), SBR (styrene-b-butadiene rubber), EPDM (ethylene-propylene diene modified), polychloroprene, polynorbornene, natural rubber, recycled rubber, polybutene, polyisobutylene, SEBS (styrene-ethylene/butylene-styrene copolymer). Mention may also be made of the elastomers produced from styrene monomers and butadiene monomers that enable crosslinking without a crosslinking agent as described in document WO 2007/058994 and by the applicant in patent application WO 2011/013073. The teachings described in applications WO 2007/058994 and WO 2011/013073 are incorporated by reference into the present description, in particular the definitions of the polymers described in these two applications are incorporated by reference into the present description.

Advantageously, the S-B1-B2 block terpolymers and the (S-BI-B2)$_n$X copolymers which were defined above represent at least 50% by weight of the elastomers present in the composition, more preferably still at least 70% by weight. According to one preferred variant of the invention, the elastomer essentially consists of S-B1-B2 block terpolymers and (S-BI-B2)$_n$X block copolymers.

The molecular weight of the copolymer is measured by GPC chromatography with a polystyrene standard according to the ASTM D5296-05 standard.

The composition may also additionally comprise plastomers.

In particular, the composition according to the invention may also additionally contain one or more polymeric components selected from the category of known bitumen plastomers such as the polyethylenes PE (polyethylene) and HDPE (high-density polyethylene), polypropylene PP, EVA (polyethylene/vinyl acetate copolymer), EMA (polyethylene/methyl acrylate copolymer), copolymers of olefins and of unsaturated carboxylic esters, EBA (polyethylene/butyl acrylate copolymer), copolymers of ethylene and of esters of acrylic or methacrylic acid or of maleic anhydride, ethylene/propylene copolymers, ABS (acrylonitrile-butadiene-styrene).

Advantageously, when the composition according to the invention comprises at least one plastomer as defined above, the S-B1-B2 block terpolymers and the (S-BI-B2)$_n$X copolymers represent at least 50% by weight relative to the total weight of all of the S-B1-B2 block terpolymers, (S-BI-B2)$_n$X copolymers and plastomers present in the composition, more preferably still at least 70% by weight.

According to one variant of the invention, the composition may comprise, in addition to the S-B1-B2 block terpolymers and the (S-BI-B2)$_n$X copolymers, at least one other elastomer as defined above and at least one plastomer as defined above.

Advantageously, when the composition according to the invention additionally comprises at least one other elastomer as defined above and at least one plastomer as defined above, the S-B1-B2 block terpolymers and the (S-BI-B2)$_n$X copolymers represent at least 50% by weight relative to the total weight of all of the S-B1-B2 block terpolymers, (S-BI-B2)$_n$X copolymers, elastomers and plastomers present in the composition, more preferably still at least 70% by weight.

Other Additives:

In a known manner, the following may also be added to the bitumen/polymer composition of the invention:

a) adhesion agents and/or surfactants. They are generally selected from alkylamine derivatives, alkylpolyamine derivatives, alkylamidopolyamine derivatives and derivatives of quaternary ammonium salts, taken alone or as a mixture. The amount of adhesion agents and/or surfactants in the bitumen/polymer composition is, for example, between 0.2% and 2% by weight, preferably between 0.5% and 1% by weight, relative to the total weight of the bitumen/polymer composition.

b) waxes of animal or vegetable origin or hydrocarbon waxes, in particular long-chain hydrocarbon waxes, for example polyethylene waxes or paraffin waxes, which are optionally oxidized. Amide waxes such as ethylene bis (stearamide) could also be added.

c) paraffins having chain lengths of 30 to 120 carbon atoms ($C_{30}$ to $C_{120}$). The paraffins are selected from polyalkylenes. Preferably, the paraffins are polymethylene paraffins and polyethylene paraffins. These paraffins could be of petroleum origin or originate from the chemical industry. Preferably, the paraffins are synthetic paraffins derived from the conversion of biomass and/or natural gas.

These paraffins may also contain a large proportion of "normal" paraffins, i.e. unbranched, straight-chain linear paraffins (saturated hydrocarbons). Thus, the paraffins may comprise from 50% to 100% of normal paraffins and from 0 to 50% of isoparaffins and/or of branched paraffins. Preferably, the paraffins comprise from 85% 30 to 95% of normal paraffins and from 5% to 15% of isoparaffins and/or of branched paraffins. More preferably, the paraffins comprise from 50% to 100% of normal paraffins and from 0 to 50% of isoparaffins. Preferably, the paraffins comprise from 85% to 95% of normal paraffins and from 5% to 15% of isoparaffins.

Advantageously, the paraffins are polymethylene paraffins. More particularly, the paraffins are synthetic polymethylene paraffins, in particular paraffins resulting from the conversion of syngas by the Fischer-Tropsch process. In the Fischer-Tropsch process, the paraffins are obtained by reacting hydrogen with carbon monoxide over a metal catalyst. Fischer-Tropsch synthesis processes are described for example in the publications EP 1 432 778, EP 1 328 607 or EP 0 199 475.

Preferably, the paraffins are Fischer-Tropsch polymethylene paraffins sold by Sasol, in particular under the Sasobit® brand.

d) fluxes such as oils based on animal and/or vegetable fatty substances or hydrocarbon oils of petroleum origin. The oils of animal and/or vegetable origin could be in the form of free fatty acids, triglycerides, diglycerides, monoglycerides, or in esterified form, for example in methyl ester form.

e) resins of vegetable origin such as rosins.

f) antifoam additives, in particular (but nonlimitingly) selected from polysiloxanes, oxyalkylated polysiloxanes and amides of fatty acids derived from vegetable or animal oils.

g) detergent additives and/or corrosion inhibitors, in particular (but nonlimitingly) selected from the group consisting of amines, succinimides, alkenylsuccinimides, polyalkylamines, polyalkylpolyamines, polyetheramines and imidazolines.

h) slip additives or antiwear agents, in particular (but nonlimitingly) selected from the group consisting of fatty acids and the ester or amide derivatives thereof, in particular glycerol monooleate, and derivatives of monocyclic and polycyclic carboxylic acids.

i) crystallization-modifying additives, additives which inhibit paraffin deposits, additives which lower the pour point; modifiers of the rheology at low temperature such as ethylene/vinyl acetate (EVA) and/or ethylene/vinyl propionate (EVP) copolymers, ethylene/vinyl acetate/vinyl versatate (EA/AA/EOVA) terpolymers; ethylene/vinyl acetate/ alkyl acrylate terpolymers; EVA copolymers modified by grafting; polyacrylates; acrylates/vinyl acetate/maleic anhydride terpolymers; amidated maleic anhydride/alkyl (meth) acrylate copolymers capable of being obtained by reacting a maleic anhydride/alkyl (meth)acrylate copolymer and an alkylamine or polyalkylamine having a hydrocarbon chain of from 4 to 30 carbon atoms, preferably of from 12 to 24 carbon atoms; amidated alpha-olefin/maleic anhydride copolymers capable of being obtained by reacting an alpha-olefin/maleic anhydride copolymer and an alkylamine or polyalkylamine, it being possible for the alpha-olefin to be selected from $C_{10}$-$C_{50}$, preferably $C_{16}$-$C_{20}$, alpha-olefins and the alkylamine or polyalkylamine advantageously having a hydrocarbon chain of from 4 to 30 carbon atoms, preferably of from 12 to 24 carbon atoms.

j) antioxidants, for example of hindered phenolic type or aminophenolic type of alkylated para-phenylenediamine type.

k) metal passivators.

l) acidity neutralizers.

m) additives that make it possible to lower the mixing temperature of the asphalts and bituminous mixes, those that make it possible to improve the adhesion of the bituminous binders to the fillers and the aggregates, such as for example polyisobutylene succinimides.

n) acids such as polyphosphoric acid or diacids, in particular fatty diacids.

The additives are used in amounts well known to those skilled in the art, as a function of the nature of the additive, as a function of the bitumen base and of the expected properties.

When it comprises one or more additives, the bitumen base comprises from 0.1% to 10% by weight, preferably from 0.5% to 5% by weight, more preferably from 0.5% to 2.5% by weight of chemical additive relative to the total weight of the bitumen base.

The Composition:

Advantageously, the bitumen/polymer composition comprises:
  bitumen,
  from 0.5% to 20% by weight of at least one elastomer as defined above,
  from 0.05% to 2.5% by weight of at least one olefinic polymer adjuvant as defined above,
  from 0 to 5% of additives.

More advantageously still, the bitumen/polymer composition comprises:
  bitumen,
  from 0.5% to 15% by weight of at least one elastomer as defined above,
  from 0.15% to 2% by weight of at least one olefinic polymer adjuvant as defined above,
  from 0 to 5% of additives.

Advantageously, the bitumen/polymer composition essentially consists of:
  bitumen,
  from 0.5% to 20% by weight of at least one elastomer as defined above,
  from 0.05% to 2.5% by weight of at least one olefinic polymer adjuvant as defined above,
  from 0 to 5% of additives.

More preferably, the bitumen/polymer composition essentially consists of:
  bitumen,
  from 0.5% to 15% by weight of at least one elastomer as defined above,
  from 0.15% to 2% by weight of at least one olefinic polymer adjuvant as defined above,
  from 0 to 5% of additives.

The weight percentages are calculated relative to the total weight of said composition.

According to the invention, the elastomer/olefinic polymer adjuvant weight ratio is advantageously from 15/1 to 2/1, preferably from 12/1 to 5/2.

The Manufacturing Process:

The bitumen/polymer compositions of the invention may be prepared by any process known to those skilled in the art. As a general rule, these processes comprise the mixing of the components and the heating of the mixture. The bitumen may be heated before mixing. Customarily, the bitumen is heated before mixing, and the other components are added to the bitumen without having been preheated.

According to one particular embodiment of the invention, a bitumen/polymer composition is prepared by bringing the following into contact:
bitumen,
from 0.5% to 20% by weight, preferably from 0.5% to 15% by weight of at least one elastomer,
from 0.05% to 2.5% by weight, preferably from 0.15% to 2% by weight of at least one olefinic polymer adjuvant,
optionally additives.

The weight percentages are calculated relative to the total weight of said composition.

The operation is carried out at temperatures ranging from 100° C. to 200° C., preferably from 150° C. to 200° C., more preferably from 160° C. to 200° C., and with stirring for a period of at least 10 minutes, preferably from 1 hour to 24 hours, more preferably from 1 hour to 10 hours.

The process of the invention may be carried out by means of stirring that produces a high shear or of stirring that produces a low shear. The process of the invention may comprise successive sequences with different stirring modes, for example the process of the invention may comprise at least two successive stirring sequences, a first sequence producing high-shear stirring followed by a second sequence that produces low-shear stirring.

According to one preferred embodiment, the process for manufacturing the bitumen/crosslinked polymer composition comprises, for example, the following successive steps:
i) the bitumen, the thermally crosslinkable elastomer and the olefinic polymer adjuvant, and optionally the additives, are introduced into a reactor,
ii) the mixture is stirred until a homogeneous mixture is obtained and heated at a temperature ranging from 100° C. to 200° C., preferably from 150° C. to 200° C., more preferably from 160° C. to 200° C., for a period of at least 10 minutes, preferably from 1 hour to 24 hours, more preferably from 1 hour to 10 hours.

In the embodiment described above, the olefinic polymer adjuvant may be incorporated into the bitumen before or after the thermally crosslinkable elastomer, it being possible to also envisage a simultaneous incorporation.

The order of introducing the various constituents has no significant influence on the mechanical properties of the bitumen/polymer composition thus obtained.

In particular, the olefinic polymer adjuvant is incorporated into the bitumen before or after the elastomer.

Also in particular, the olefinic polymer adjuvant and the elastomer are incorporated into the bitumen.

According to another preferred embodiment, the process for manufacturing the bitumen/crosslinked polymer composition comprises, for example, the following successive steps:
i) the bitumen, the thermally crosslinkable elastomer and the olefinic polymer adjuvant, and optionally the additives, are introduced into a reactor,
ii) the mixture is stirred at a temperature ranging from 100° C. to 200° C., preferably from 150° C. to 200° C., more preferably from 160° C. to 200° C., for a period of at least 1 minute, preferably between 1 min and 2 hours, more preferably between 1 min and 30 min, then homogenized by passing into a high-shear mill,
iii) the mixture obtained in step ii) is then transferred to a maturing tank for a period of at least 30 min, preferably from 30 min to 24 hours, more preferably from 1 hour to 10 hours before the storage thereof or the use thereof.

Preferably, the stirring at a high shear, and in particular the stirring carried out by passing into a high-shear mill, makes it possible to facilitate the good dispersion and the good distribution of the polymer and of the olefinic polymer adjuvant.

Use of Bitumen/Polymer Compositions According to the Invention:

Various uses of the bitumen/polymer compositions obtained according to invention are envisaged. In particular, the bitumen/polymer compositions may be used for the preparation of a bitumen/polymer binder. The bitumen/polymer binder according to the invention may be used in combination with aggregates, especially road aggregates.

Regarding the road applications, the invention targets in particular bituminous mixes as materials for the construction and maintenance of road foundations and their surfacing, and also for carrying out all highway works.

Bituminous mix is understood to mean a mixture of a bituminous binder with aggregates and optionally mineral and/or synthetic fillers.

The bituminous mix comprises a bitumen/polymer binder according to the invention, and optionally mineral and/or synthetic fillers, preferably selected from fines, sand, gravel and recycled milled products. The aggregates are mineral and/or synthetic aggregates, in particular recycled milled products, with dimensions of greater than 2 mm, preferably of between 2 mm and 20 mm.

The bitumen/polymer binder according to the invention may advantageously be used for preparing a surface dressing, a hot bituminous mix, a warm bituminous mix, a cold bituminous mix, a cold-poured bituminous mix or an emulsion gravel.

Regarding the road applications, the invention also targets asphalts as materials for constructing and covering sidewalks.

Asphalt is understood to mean a mixture of bituminous binder with mineral and/or synthetic fillers.

An asphalt comprises a bitumen/polymer binder according to the invention and mineral fillers such as fines, sand or gravel, and/or synthetic fillers. The mineral fillers are composed of fines (particles with dimensions of less than 0.063 mm), of sand (particles with dimensions of between 0.063 mm and 2 mm) and optionally of gravel (particles with dimensions of greater than 2 mm, preferably of between 2 mm and 4 mm).

The asphalts exhibit 100% compactness and are mainly used to construct and cover sidewalks, whereas the bituminous mixes have a compactness of less than 100% and are used to construct roads. Unlike the bituminous mixes, the asphalts are not compacted with a roller when being put in place.

Another aspect of the invention is the use of a bitumen/polymer composition in various industrial applications, in particular for preparing a waterproof coating, a membrane or a seal coat.

Regarding the industrial applications of the bituminous compositions according to the invention, mention may be made of the manufacture of waterproofing membranes, of noise-reduction membranes, of insulating membranes, of surface coatings, of carpet tiles or of seal coats.

Another subject of the invention is the use of poured bitumen/polymer binders, bituminous mixes and asphalts according to the invention for the construction of road surfacings, carriageways, sidewalks, highways, urban developments, ground surfaces, waterproofing of buildings or structures, in particular for construction in road applications, of foundation courses, base courses, bedding courses, surface courses such as binder courses and/or wearing courses.

Experiment Section:

A—Materials and Methods

The properties of the bitumens are measured by means of the methods described below:

Needle penetrability at 25° C. (P25): unit=1/10 mm, EN 1426 standard.

Ring and ball softening point (RBSP): unit=° C., EN1427 standard.

Elastic recovery at 25° C. (R25): unit=%, EN 13398 standard.

Tensile test at 5° C., 100 mm/min (ε max represents the maximum elongation at break): unit=%, EN 13587 standard.

Stability: the storage stability is evaluated by measuring the difference in penetrability and the difference in RBSP after storage at 180° C. for 3 days.

Raw Materials:

Bitumen base (B): use is made of a bitumen base of 35/50 grade having a penetrability $P_{25}$ of 37 1/10 mm and an RBSP of 52.6° C., commercially available from the TOTAL group under the AZALT® brand.

Bitumen base (B1): use is made of a bitumen base of 35/50 grade having a penetrability $P_{25}$ of 39 1/10 mm and an RBSP of 53.0° C., commercially available from the TOTAL group under the AZALT® brand.

Bitumen base (B2): use is made of a bitumen base of 70/100 grade having a penetrability $P_{25}$ of 75 1/10 mm and an RBSP of 45.4° C., commercially available from the TOTAL group under the AZALT® brand.

Bitumen base (B3): use is made of a bitumen base of 10/20 grade having a penetrability $P_{25}$ of 14 1/10 mm and an RBSP of 66.6° C., commercially available from the TOTAL group under the MODULOTAL® brand.

Bitumen base (B4): use is made of a bitumen base of 70/100 grade having a penetrability $P_{25}$ of 77 1/10 mm and an RBSP of 46° C., commercially available from the TOTAL group under the AZALT® brand.

Bitumen base (B5): use is made of a bitumen base of 35/50 grade having a penetrability $P_{25}$ of 37 1/10 mm and an RBSP of 53.2° C., commercially available from the TOTAL group under the AZALT® brand.

Bitumen base (B6): use is made of a bitumen base of 50/70 grade having a penetrability $P_{25}$ of 55 1/10 mm and an RBSP of 49.6° C., commercially available from the TOTAL group under the AZALT® brand.

Bitumen base (B7): use is made of a bitumen base of 160/220 grade having a penetrability $P_{25}$ of 176 1/10 mm and an RBSP of 39.0° C., commercially available from the TOTAL group under the AZALT® brand.

Polymer adjuvant (Adj): ethylene/butyl acrylate/glycidyl methacrylate terpolymer in weight proportions, respectively, of 70/21/9 and having a melt flow rate (MFR) (190° C./2.16 kg) of 8 g/10 min, calculated according to the ASTM D1238-ISO 1133 standard. This polymer is commercially available under the name Elvaloy® 4170 from the company Dupont.

Elastomer (E): use is made of a mixture based on S-B1-B2 block terpolymer also comprising (S-BI-B2)$_n$X copolymer where S represents a monovinylaromatic hydrocarbon block having a peak molecular weight of from 10 000 to 25 000, B1 is a polybutadiene block having a vinyl content of less than or equal to 15 mole percent, B2 is a polybutadiene block having a vinyl content of greater than or equal to 25 mole percent, the B1/B2 ratio is greater than or equal to 1:1, the S-B1-B2 block copolymer has a peak molecular weight of from 40 000 to 200 000, n is an integer ranging from 2 to 6, X is the residue of a coupling agent, the (S-B1-B2)$_n$X block copolymer has a peak molecular weight which is from 1.5 to 6.0 times the peak molecular weight of the S-B1-B2 block copolymer, in which the S-B1-B2/(S-B1-B2)$_n$X weight ratio is greater than or equal to 1:1. The vinyl group content of the mixture is 20.2% by weight relative to the total weight of the mixture of polymers. The weight-average molecular weight of the mixture is 235 000 daltons. This elastomer is available from the company Kraton.

Elastomer (E1): use is made of a styrene/butadiene/styrene (SBS) block copolymer containing 30.5% by weight of styrene and 69.5% by weight of butadiene. The 1,2-vinyl group content is 27.8% by weight relative to the total weight of copolymer. The copolymer has a weight-average molecular weight (Mw) of 142 500 daltons and a polydispersity index $I_p$ of 1.09. This copolymer is commercially available from the company KRATON under the name D1192.

B—Preparation of the Bitumen/Polymer Compositions:

The compositions C1 to C5, C13 and C14 corresponding to the mixtures described below in Tables 1 and 1a were prepared with the reaction time indicated.

The process comprises the following steps:

Mixing of the components at 180° C.

Introducing the components into a Silverson® reactor and stirring for 15 minutes in order to obtain a homogeneous mixture.

Next the mixture is stirred for 6 h: at 400 rpm and at 180° C.

The composition C9 corresponding to the mixture described below in Table 1a was prepared with the reaction time indicated.

The process comprises the following steps:

Mixing of the components at 180° C.

Introducing the components into a Silverson® reactor and stirring for 3 hours in order to obtain a homogeneous mixture.

Next the mixture is stirred for 2 h: at 400 rpm and at 180° C.

The compositions C6 to C8 and C10 to C12 corresponding to the mixtures described in Tables 1 and 1a were prepared with the reaction time indicated.

The process comprises the following steps:

Mixing of the components at 180° C.

Introducing the components into a Silverson® reactor and stirring for 3 hours in order to obtain a homogeneous mixture at 180° C.

Next the mixture is stirred for 2 h: at 400 rpm and at 180° C.

The mixture thus obtained is diluted with a bitumen base previously brought to a temperature of 180° C., then the mixture is subjected to stirring at 400 rpm and at 180° C. for 1 hour.

The amounts indicated in the tables are weight percentages relative to the total weight of the composition. The compositions C1, C2, C13 and C14 are comparative compositions and the compositions C3 to C12 are according to the invention.

TABLE 1 compositions prepared C1 to C7

| Composition | C1 | C2 | C3 | C4 | C5 | C6 | C7 |
|---|---|---|---|---|---|---|---|
| B | 97.5 | 96.5 | 97.25 | 96 | — | — | — |
| B1 | — | — | — | — | 96.72 | — | — |
| B2 | — | — | — | — | — | 57.15 | — |
| B3 | — | — | — | — | — | 40 | 40 |
| B4 | — | — | — | — | — | — | 56.62 |
| B5 | — | — | — | — | — | — | — |
| B6 | — | — | — | — | — | — | — |
| B7 | — | — | — | — | — | — | — |
| E | 2.5 | 3.5 | 2.5 | 3 | 2.85 | 2.58 | 2.94 |
| E1 | — | — | — | — | — | — | — |
| Adj | — | — | 0.25 | 1 | 0.43 | 0.27 | 0.44 |
| Reaction time | 6 h | 6 h | 6 h | 6 h | 6 h | 6 h | 6 h |

TABLE 1a compositions prepared C8 to C14

| Composition | C8 | C9 | C10 | C11 | C12 | C13 | C14 |
|---|---|---|---|---|---|---|---|
| B | — | — | — | — | — | — | — |
| B1 | — | — | — | — | — | 96.72 | 96.55 |
| B2 | — | — | — | — | — | — | — |
| B3 | — | — | — | — | — | — | — |
| B4 | — | 94.3 | 51.87 | — | 34 | — | — |
| B5 | 97.15 | — | — | 96.48 | — | — | — |
| B6 | — | — | 45 | — | — | — | — |
| B7 | — | — | — | — | 62.83 | — | — |
| E | 2.58 | 5 | 2.75 | 3 | 2.77 | — | — |
| E1 | — | — | — | — | — | 2.85 | 3.2 |
| Adj | 0.27 | 0.7 | 0.38 | 0.52 | 0.4 | 0.43 | 0.43 |
| Reaction time | 6 h | 5 h | 6 h | 6 h | 6 h | 6 h | 6 h |

C—Continuous In-Line and High Shear Industrial Process for Manufacturing a Bitumen/Polymer Composition According to the Invention:

A bitumen/polymer composition C15 was prepared by means of a continuous in-line and high shear industrial process by mixing at a temperature between 185° C. and 195° C. and at high shear:
  97.07% of a bitumen base of 35/50 grade having a penetrability $P_{25}$ of 42 $^{1}/_{10}$ mm and an RBSP of 52° C. (commercially available from the TOTAL group under the AZALT® brand),
  2.57% of the polymer E and
  0.36% of Adj; the percentages being given by weight relative to the total weight of the composition.

The mixture thus obtained is then mixed for 4 h at a temperature between 185° C. and 195° C.

D—Industrial Process for Manufacturing a Bitumen/Polymer Composition According to the Invention by Milling with External Recirculation:

A bitumen/polymer composition C16 was prepared by means of an industrial process by milling with external recirculation by mixing for 3 hours at a temperature of 195° C.:
  96.72% by weight of a bitumen base of 30/45 grade having a penetrability $P_{25}$ of 36 $^{1}/_{10}$ mm and an RBSP of 54.6° C. (commercially available from the TOTAL group under the AZALT® brand),
  2.85% of the polymer E and
  0.43% of Adj; the percentages being given by weight relative to the total weight of the composition.

The mixture thus obtained is then mixed for 2 h at a temperature of 195° C.

E—Results

The compositions are tested according to the methods explained above. The results are reported in Table 2:

TABLE 2 properties of the compositions prepared C1 to C8

| | | Composition | | | | | | | |
|---|---|---|---|---|---|---|---|---|---|
| | | C1 | C2 | C3 | C4 | C5 | C6 | C7 | C8 |
| Penetrability (dmm) | | 31 | 32 | 33 | 31 | 34 | 33 | 32 | 33 |
| RBSP (° C.) | | 57.6 | 63.8 | 58.4 | 62.6 | 60.4 | 60 | 62.2 | 57.8 |
| Elastic recovery (%) | | 66 | 86 | 71 | 77 | 74 | 70 | 76 | 67 |
| Tensile test at 5° C. | Energy at 400% (J/cm²) | — | — | 17.51 | 18.46 | 21.9 | 19.4 | 22.1 | 21.7 |
| | Max elongation (%) | 59 | 305 | 700 | 700 | 688 | 700 | 687 | 700 |
| Storage stability 3 days at 180° C. | Δ penetrability (dmm) | 3 | 12 | 1 | 3 | 1 | 0 | 0 | 0 |
| | Δ RBSP (° C.) | 0.2 | 21.8 | 0.8 | 3.4 | 1 | 0.6 | 0.2 | 0 |

ND: not determined

TABLE 2a properties of the compositions prepared C9 to C16

| | | Composition | | | | | | | |
|---|---|---|---|---|---|---|---|---|---|
| | | C9 | C10 | C11 | C12 | C13 | C14 | C15 | C16 |
| Penetrability (dmm) | | 48 | 53 | 30 | 95 | 33 | 34 | 37 | 33 |
| RBSP (° C.) | | 89.5 | 61.2 | 62.4 | 49.8 | 59.2 | 60.8 | 60 | 64 |
| Elastic recovery (%) | | 95 | ND | 76 | 69 | 62.8 | 75 | 76 | 78 |
| Tensile test at 5° C. | Energy at 400% (J/cm$^2$) | 15.25 | 14.08 | 22.46 | 6.52 | 22.51 | 22.48 | 22.15 | 19.8 |
| | Max elongation (%) | 700 | 700 | 700 | 700 | 295 | 457 | 682 | 695 |
| Storage stability 3 days at 180° C. | Δ penetrability (dmm) | 1 | 0 | 0 | 1 | 2 | 1 | 1 | 0 |
| | Δ RBSP (° C.) | 0.5 | 0.2 | 0.8 | 0.2 | 0 | 0.8 | 0.8 | 0.4 |

ND: not determined

A synergistic effect is observed between the block polymer according to the invention and the olefinic polymer adjuvant, which makes it possible to obtain a very significant improvement in the mechanical properties, especially in the elastic properties, in particular tensile properties at 5° C., with very small amounts of block polymer/adjuvant system. This synergistic effect between the block polymer and the olefinic polymer adjuvant also makes it possible to obtain a significant improvement in the storage stability at high temperature, especially a storage stability at 180° C., of the bitumen/polymer composition with very small amounts of block polymer/adjuvant system.

Furthermore, it is observed that there is no synergistic effect between the block polymer E1 and the olefinic polymer adjuvant since the tensile properties at 5° C., with very small amounts of block polymer/adjuvant system are less than 500%.

Consequently, it is demonstrated that the combination of the block polymer and of the olefinic polymer adjuvant according to the invention makes it possible to obtain a very significant improvement in the mechanical properties, especially the elastic properties, in particular the tensile properties at 5° C., with very small amounts of block polymer/adjuvant system.

F— Preparation of Bituminous Mixes and Measurement of Their Mechanical Properties:

A bituminous mix (EB1) is respectively obtained from the composition C16 according to the invention and aggregates having the granular fraction described in Table 3:

TABLE 3

Particle size composition

| | Fraction (mm) | | | | |
|---|---|---|---|---|---|
| | 0/2 | 2/4 | 4/6 | 6/10 | Filler |
| Weight (%) | 39 | 10 | 12 | 38 | 1 |

The bituminous mix (EB1) is prepared in the following manner:
- the aggregates are brought to the temperature of 175° C. for a duration of 8 h approximately,
- the bituminous composition C16 is heated to 175° C. then poured onto the preheated aggregates, the mixture thus obtained is mixed for around 90 seconds at 175° C.

The bituminous mix thus obtained has a content of bituminous composition C16 of 5.7% by weight relative to the total weight of the mix.

A bituminous mix is characterized as a high-modulus asphalt concrete for a wearing or binder course of type EB10, also referred to as class 3 BBME [HMAC] according to the standard NF EN 13108-1, if it has at least the following characteristics described in Table 4:

TABLE 4 mechanical properties of the bituminous mix (EB1)

| | EB1 mix | Class 3 BBME [HMAC] specifications according to standard EN 13108-1 |
|---|---|---|
| Duriez test at 18° C.[1] (r/R) | 0.89 | ≥0.8 |
| Wheel tracking test at 30 000 cycles (%)[2] | 1.7 | <5 |
| Test of complex modulus at 15° C. and at 10 Hz (MPa)[3] | 11 500 | ≥11 000 |
| Fatigue test (μdef for 10$^6$ cycles)[4] | 199 | ≥100 |

[1]Test of resistance to water stripping according to standard EN 12697-12, reflecting the adhesion between the bitumen/polymer composition and the aggregates.
[2]Test of resistance to wheel tracking according to standard EN 12697-22, reflecting the ability of the bituminous mix to withstand creep linked to the application of traffic.
[3]Measurement of the complex stiffness modulus according to standard EN 12697-26, reflecting the ability of the bituminous mix to withstand the loads.
[4]2-point bending fatigue strength test according to standard EN 12697-24, reflecting the ability of the bituminous mix to keep intact the properties of the bituminous mix as a function of the repetition of the application of the loads.

The bituminous mix (EB1) obtained from composition C16 according to the invention has mechanical properties that fulfil the conditions for use of this mix as a class 3 BBME [HMAC] for the manufacture of wearing or binder courses subjected to high traffic stresses.

The invention claimed is:
1. Bitumen/polymer composition comprising:
   bitumen,
   from 2.5% to 15% by weight of at least one elastomer relative to the total weight of the composition, and
   from 0.15% to 2% by weight, relative to the total weight of the composition, of at least one olefinic polymer chosen from random or block terpolymers of ethylene, of a monomer A selected from vinyl acetate and $C_1$ to $C_6$ alkyl acrylates or methacrylates and of a monomer B selected from glycidyl acrylate and glycidyl methacrylate, comprising from 0.5% to 40% by weight of units resulting from the monomer A and from 0.5% to 15% by weight of units resulting from the monomer B, the remainder being formed of units resulting from the ethylene, wherein:
the elastomer is selected from thermally crosslinkable block copolymers of formula S-B1-B2, in which S represents a monovinylaromatic hydrocarbon block having a peak molecular weight of from 10 000 to 25 000, B1 is a polybutadiene block having a vinyl content of less than or equal to 15 mole percent, B2 is a polybutadiene block having a vinyl content of greater than or equal to 25 mole percent, the B1/B2 weight ratio is greater than or equal to 1:1, and in which the S-B1-B2 block copolymer has a peak molecular weight of from 40 000 to 200 000;
the elastomer comprises at least one thermally crosslinkable block copolymer corresponding to the formula $(S-B1-B2)_nX$ in which each S represents a monovinylaromatic hydrocarbon block having a peak molecular weight of from 10 000 to 25 000, each B1 represents a polybutadiene block having a vinyl content of less than or equal to 15 mole percent, each B2 represents a polybutadiene block having a vinyl content of greater than or equal to 25 mole percent, n is an integer ranging from 2 to 6, and X is the residue of a coupling agent, in which the B1/B2 weight ratio is greater than or equal to 1:1, and the $(S-B1-B2)_nX$ block copolymer has a peak molecular weight which is from 1.5 to 6.0 times the peak molecular weight of the S-B1-B2 block copolymer;
the S-B1-B2/$(S-B1-B2)_nX$ weight ratio is greater than or equal to 1:1;
the elastomer/adjuvant weight ratio in the composition ranges from 15/1 to 2/1; and
said composition having a maximum elongation at break at 5° C., measured according to standard EN 13587, superior or equal to 500%, said composition having a penetrability variation, after 3 days of storage at 180° C., inferior or equal to 5 1/10 mm, the penetrability being measured at 25° C. according to standard EN 1426, and having a ring and ball temperature variation, after 3 days of storage at 180° C., inferior or equal to 5° C., the ring and ball temperature of the composition being measured according to standard EN 1427.

2. Composition according to claim 1, in which the $S-B1-B2/(S-B1-B2)_nX$ weight ratio is from 1:1 to 10:1.

3. Composition according to claim 2, in which the $S-B1-B2/(S-B1-B2)_nX$ weight ratio is from 1:1 to 4:1.

4. Composition according to claim 1, wherein the monovinylaromatic hydrocarbon block that represents S is formed from styrene monomer units.

5. Composition according to claim 1, in which the olefinic polymer adjuvant is selected from random terpolymers of ethylene, of a monomer A selected from $C_1$ to $C_6$ alkyl acrylates or methacrylates and of a monomer B selected from glycidyl acrylate and glycidyl methacrylate, comprising from 0.5% to 40% by weight of units resulting from the monomer A and from 0.5% to 15% by weight of units resulting from the monomer B, the remainder being formed of units resulting from the ethylene.

6. Process for preparing a bitumen/polymer composition according to claim 1, wherein the following are brought into contact, the operation being carried out at temperatures between 100° C. and 200° C. and with stirring for a period of at least 10 minutes:
bitumen,
from 2.5% to 15% by weight of at least one elastomer,
from 0.15% to 2% by weight of at least one olefinic polymer adjuvant,
optionally additives.

7. Composition according to claim 1 wherein it is an asphalt composition and it comprises mineral and/or synthetic fillers.

8. Composition according to claim 1, wherein it is a bituminous mix, and it comprises aggregates, and optionally mineral and/or synthetic fillers.

9. Composition according to claim 1, wherein it is a surface dressing, a hot bituminous mix, a warm bituminous mix, a cold bituminous mix, a cold-poured bituminous mix or an emulsion gravel, and it comprises aggregates and/or recycled milled products.

10. Composition according to claim 1, wherein it is a waterproof coating, a membrane or a seal coat.

11. Composition according to claim 1, which the maximum elongation at break at 5° C., measured according to standard EN 13587, is superior or equal to 600%.

12. Composition according to claim 11, which the maximum elongation at break at 5° C., measured according to standard EN 13587, is superior or equal to 650%.

13. Composition according to claim 1, having a penetrability variation, after 3 days of storage at 180° C., inferior or equal to 3 1/10 mm, the penetrability being measured at 25° C. according to standard EN 1426.

* * * * *